April 14, 1942.                E. J. VON HENKE                2,279,932
METHOD OF INSTALLING COOLING DEVICE IN WELDING ELECTRODES
             Filed Dec. 16, 1939           3 Sheets-Sheet 1
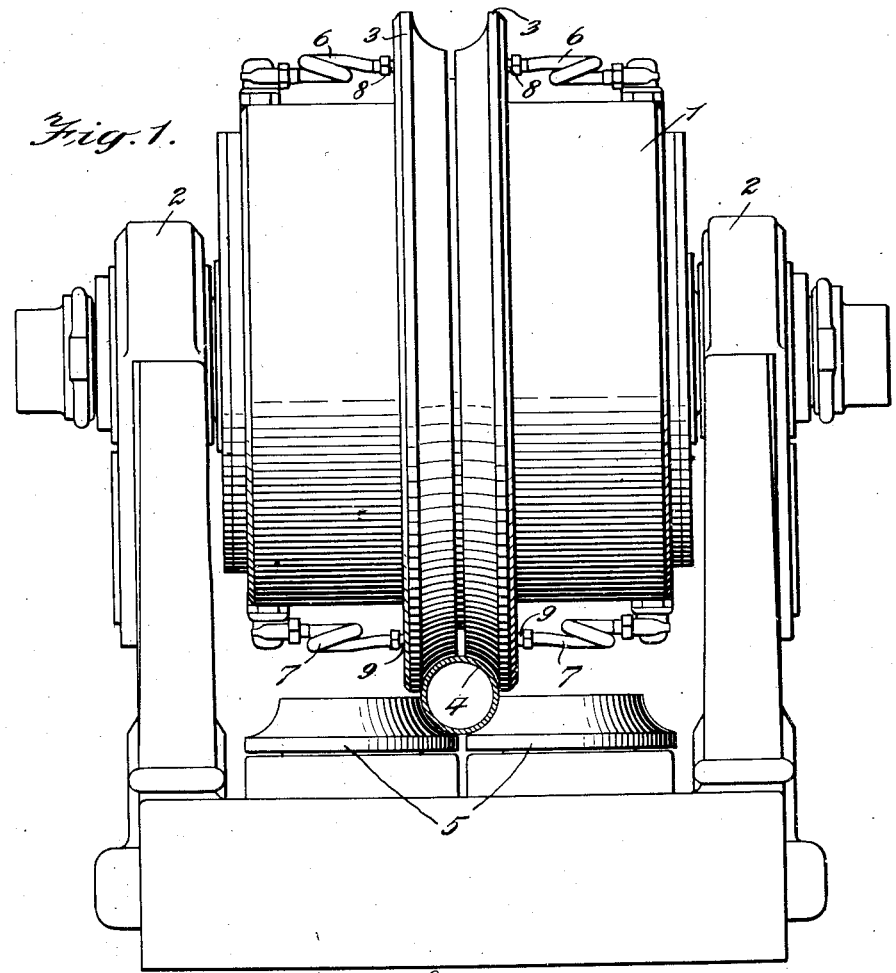
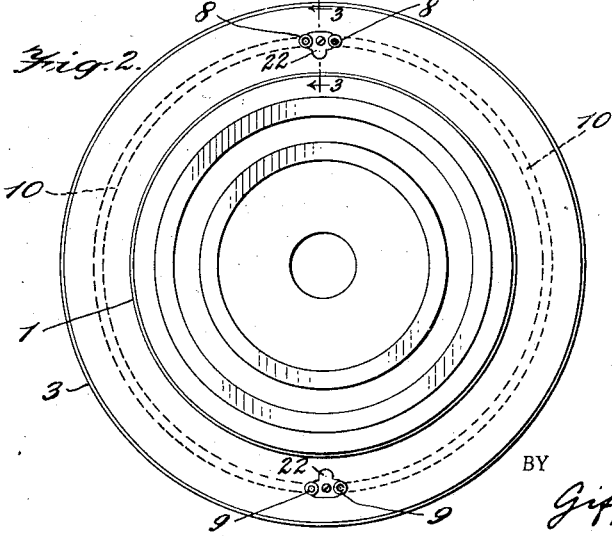
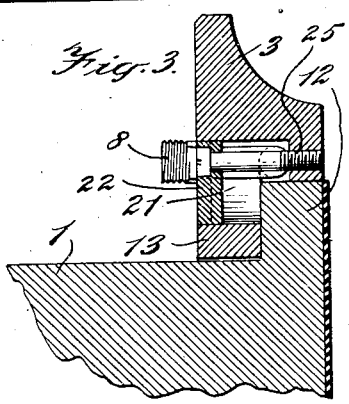
INVENTOR.
Edmund J. von Henke
BY
ATTORNEYS April 14, 1942. E. J. VON HENKE 2,279,932
METHOD OF INSTALLING COOLING DEVICE IN WELDING ELECTRODES
Filed Dec. 16, 1939 3 Sheets-Sheet 2
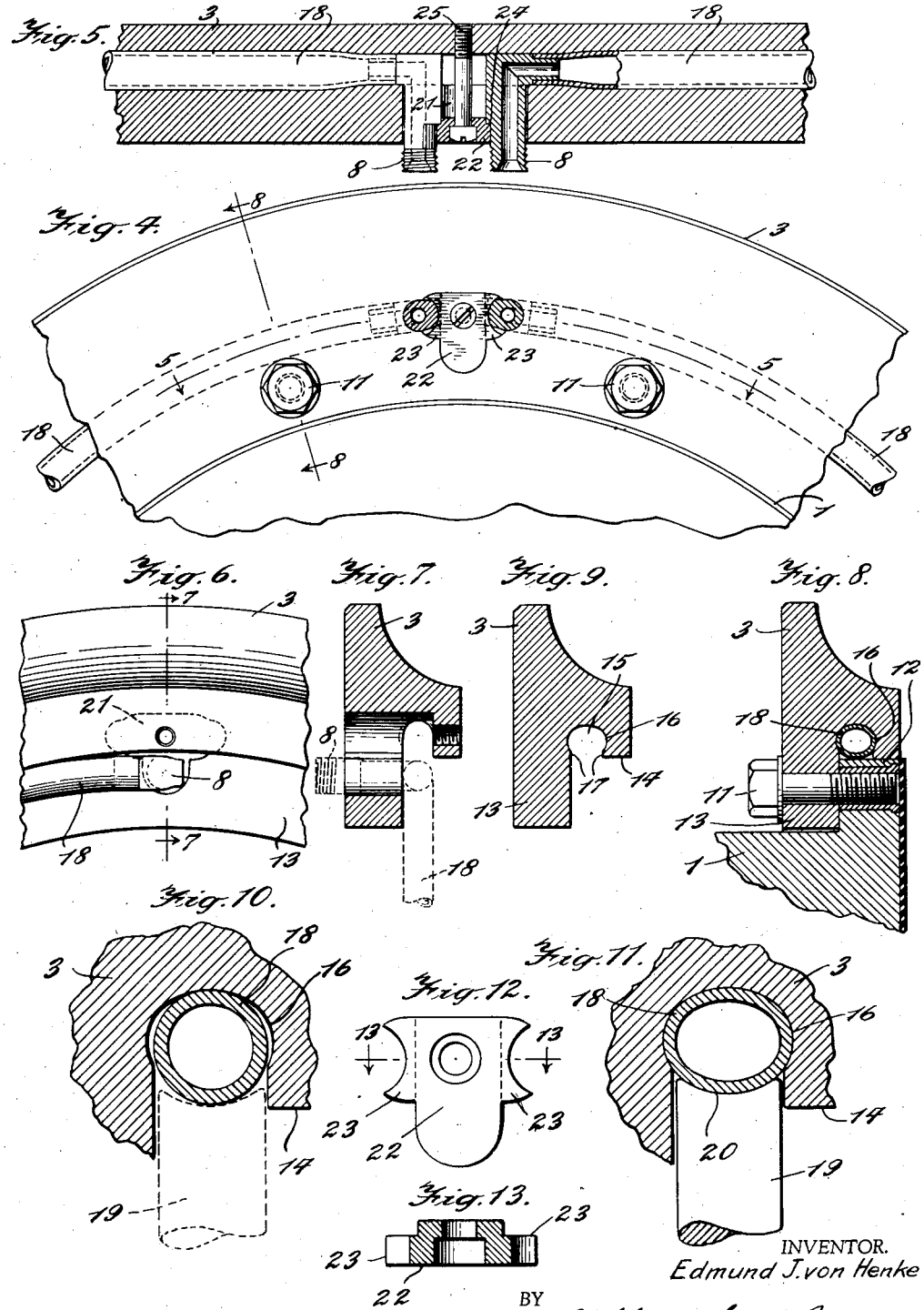
INVENTOR.
Edmund J. von Henke
BY
Gifford, Scull & Burgess
ATTORNEYS

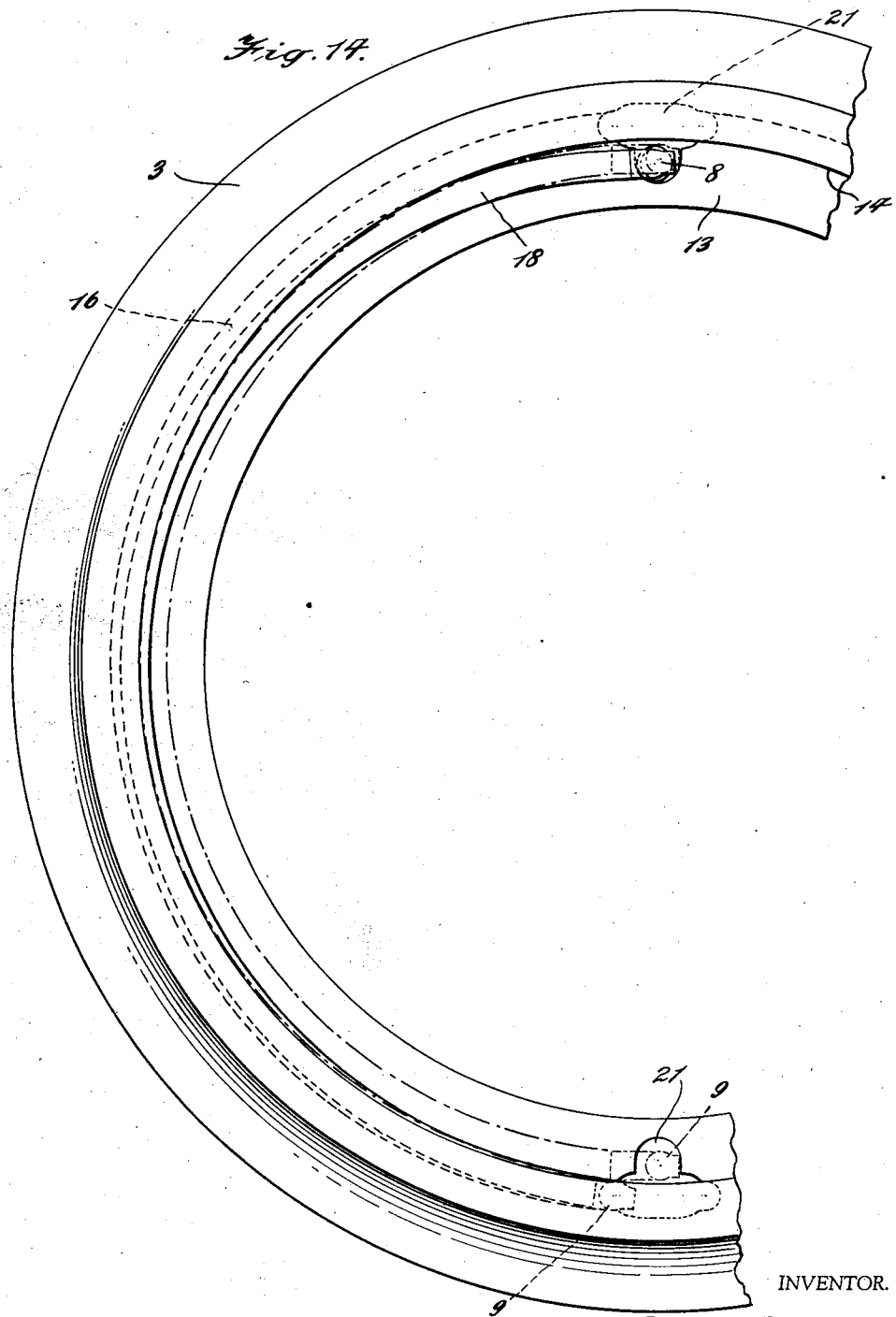

Patented Apr. 14, 1942

2,279,932

UNITED STATES PATENT OFFICE 2,279,932

METHOD OF INSTALLING COOLING DEVICES IN WELDING ELECTRODES

Edmund J. von Henke, Chicago, Ill., assignor to American Electric Fusion Corporation, Chicago, Ill., a corporation of Illinois Application December 16, 1939, Serial No. 309,566

3 Claims. (Cl. 29—148.2)

This invention relates to a novel and improved method by which a cooling tube may be installed in a welding electrode or the like. The invention will be best understood from the following description and the annexed drawings, in which I have shown a selected embodiment of the structure and have illustrated the method by which it may be made. Referring to the drawings:

Fig. 1 is an elevation of a welding transformer showing the type of electrodes with which the invention may be practiced;

Fig. 2 is a side view on a reduced scale of part of the structure appearing in Fig. 1;

Fig. 3 is a view on an enlarged scale and taken approximately on the line 3—3 of Fig. 2;

Fig. 4 is a fragmentary view of part of the structure appearing in Fig. 2, but taken on a greatly enlarged scale, parts being shown in section;

Fig. 5 is a view approximately on the line 5—5 of Fig. 4;

Fig. 6 is a fragmentary view of the structure appearing in Fig. 4 but taken from the opposite side thereof;

Fig. 7 is a view approximately on the line 7—7 of Fig. 6;

Fig. 8 is a view approximately on the line 8—8 of Fig. 4;

Fig. 9 is a section through the welding electrode illustrating the initial steps of the method;

Fig. 10 is a fragmentary view of the structure shown in Fig. 9 but illustrating a subsequent step in the method;

Fig. 11 is a view similar to Fig. 10 but showing a still later step in the method;

Fig. 12 is a face view of the clip for fastening the tube terminals in place;

Fig. 13 is a view on the line 13—13 of Fig. 12;

Fig. 14 is an enlarged elevation or view of part of one of the welding electrodes as seen from the same side of the electrode as in Fig. 6.

The invention is shown as being employed with a welding electrode for use in welding tubing although the invention may be used equally well with other electrodes or in other devices where found applicable. For the sake of illustration I have shown in Fig. 1 a welding mechanism similar to what is covered by my Patent 2,132,196, granted October 4, 1938. Briefly, that mechanism comprises a transformer I rotatably supported in bearings 2 and secured to the transformer is a pair of welding electrodes 3 which are in the form of rings having a contour adapted to engage a tube 4. The rings cooperate with rollers 5 to form a throat through which the tube passes and welding current passes through the work from one electrode ring to the other, as is well known in the art.

When welding takes place it is well known that the electrodes heat up and it is desirable to provide cooling means therefor, such means usually comprising a duct extending through the electrodes and carrying a cooling fluid such as water or oil. As illustrated in said patent and as assumed here, the cooling fluid may pass through two ducts in each ring, being supplied through suitable connections 6 and 7 shown in Fig. 1. Each connection 6 is shown as connected to a terminal 8 and each connection 7 as being connected to a terminal 9, the terminals 8 and 9 being at the opposite ends of a duct 10.

It is desirable to form the ducts of continuous tubing and it will be seen that where an electrode is curved difficulties arise in getting the tubing into the interior of the electrode, since the tube must be placed in a curved hole in the electrode. My invention is designed particularly to solve that problem and, for the sake of convenience, I shall describe the invention as being practiced in connection with a welding electrode, although it will be understood that by said description I do not intend to limit myself, as the invention may be practiced in connection with other locations where found desirable.

Each electrode ring 3 is preferably secured as by bolts 11 to a flange 12 on the transformer, as shown in my aforesaid patent. For that purpose each ring is provided with a flange 13 which lies parallel to the flange 12 so that the bolts may pass through both flanges. The result of this arrangement is that each electrode has a surface 14 which contacts the edge of the flange 12.

According to my invention, I cut a groove in the surface 14, this groove being shown at 15 in Fig. 9 and it will be seen that the groove comprises a chamber 16 and a mouth 17, the mouth having a width which is less than the width of the chamber. Preferably, the groove is formed in two operations, first by cutting out a groove of the required depth and of the same width as the mouth 17. Then the chamber 16 may be formed as a second step in the method. In any event, the finished groove is of some such form as shown in Fig. 9 and on a larger scale in Figs. 10 and 11.

The next step is shown in Fig. 10 wherein I have shown a tube 18 inserted in the chamber 16. Preferably, this tube is made of continuous copper tubing which is relatively soft and easily handled. The outside diameter of the tubing is slightly less than the width of the mouth 17 so that the tubing may be slipped through that mouth laterally of the tubing into the chamber 16, as shown in Fig. 10. Then by use of a suitable caulking tool 19, the tube is deformed and expanded laterally until the outer surface of the wall of the tube comes into intimate contact with the wall of the chamber, as shown in Fig. 11.

Preferably, the inner wall of the chamber is in the form of a part of an ellipse and thus, by hammering on the tool 19, the copper or other tubing may be forced to take the contour of the chamber. The end 20 of the tool preferably has the same curvature as the curvature of the chamber wall. Since the tubing is confined by the wall of the chamber, it cannot collapse under any ordinary blow on the tool and the result will be that the wall of the tube will be forced into intimate thermal contact with the wall of the chamber and, since this chamber is wider than the mouth, the tube at the same time will be securely anchored in position.

If desired, the outer surface of the tube may be tinned or otherwise treated with any substance which will aid in forming a more intimate contact between the outer surface of the tubing and the inner surface of the chamber.

Preferably, each electrode ring is provided with two lengths of tubing, one corresponding to each of the ducts 10 shown in Fig. 2, and preferably the terminals 8 and 9 are secured to the ends of the tubes before they are inserted in place. These terminals may be in the form of elbows, as best shown in Fig. 5, and these elbows may be brazed to the ends of the tubes.

To accommodate the terminals, I provide each flange 13 with a hole 21 which may be of the shape indicated, so that one of the tubes 18 may be placed first with its two terminals 8 and 9 in the holes, as shown in Fig. 14, and then the tube may be gradually worked into the chamber 16, starting from the position shown in dot and dash lines in Fig. 14. In so doing, the terminal 9, for example, will move from the position shown in dot and dash lines in Fig. 14, into the position shown in dotted lines therein, and the terminal 8 will make a similar change in position.

By this arrangement, each tube length may be secured to its terminals and then the entire article may be put in place as described. After being brought to final position, the terminals may be further anchored in place by means of a clip 22 which has flanges 23 engaging shoulders 24 on the terminals, as plainly shown in Fig. 5. The clip may be held in place by a screw 25.

While I have shown the invention as embodied in a specific form, it is to be understood that various changes in details may be made without departing from the scope of the invention as defined by the appended claims.

I claim:

1. The method of installing a substantial length of tube in a metal body which comprises forming a groove of corresponding length in said body, enlarging said groove to form a chamber with a relatively narrow mouth, inserting the tube laterally thereof through said mouth into said chamber, and then deforming said tube to make it contact with the walls of the chamber.

2. The method of installing a substantial length of tube in a metal body which comprises forming a groove of corresponding length in said body, enlarging said groove to form a chamber with a relatively narrow mouth, inserting the tube laterally thereof through said mouth into said chamber, and then expanding said tube laterally to make it wider than said mouth.

3. The method of installing a tube in a curved electrode or the like which comprises forming a curved groove in one surface of said electrode, with a chamber having a mouth of less width than the width of the chamber, inserting the tube through said mouth into said chamber, and expanding the tube throughout substantially its entire length.

EDMUND J. von HENKE.